UNITED STATES PATENT OFFICE.

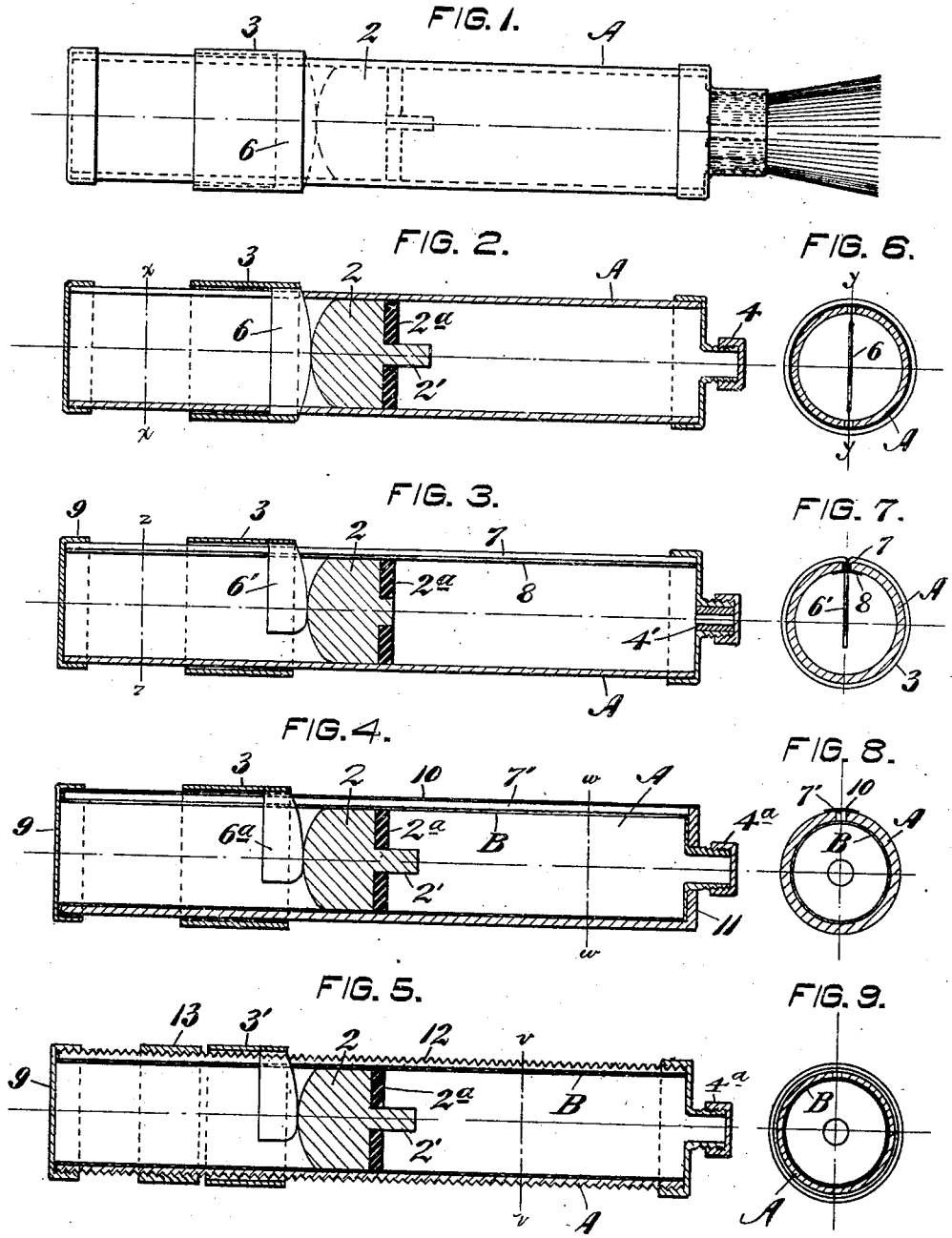

GILBERT L. BELCHER, OF SAN FRANCISCO, CALIFORNIA.

DISPENSING DEVICE.

No. 809,419.      Specification of Letters Patent.      Patented Jan. 9, 1906.

Application filed January 25, 1905. Serial No. 242,640.

*To all whom it may concern:*

Be it known that I, GILBERT L. BELCHER, a citizen of the United States, residing in the city and county of San Francisco and State of California, have invented new and useful Improvements in Dispensing Devices, of which the following is a specification.

The invention relates to a dispensing can or holder to contain pastes, lubricants, and like viscous substances and also liquids or semiliquids, and pertains especially to a container whose contents are adapted to be discharged through the agency of a follower or plunger.

The object of my invention is to provide a simple, practical, inexpensive, and convenient holder which will also serve as a handle, whereby the contents are kept sealed and thoroughly protected from the air, which holder will maintain its shape as against ordinary external pressure and which by a suitable contrivance will be made to eject its contents as desired.

The invention consists of the parts and the construction and combination of parts, as hereinafter more fully described and claimed, having reference to the accompanying drawings, in which—

Figure 1 is a side elevation of my invention, showing its application to a brush. Fig. 2 is a longitudinal section of a simple form of my invention on line *y y*, Fig. 6. Figs. 3, 4, 5 are similar sections of modifications of the invention. Fig. 6 is a cross-section on line *x x*, Fig. 2. Fig. 7 is a cross-section on line *z z*, Fig. 3. Fig. 8 is a cross-section on line *w w*, Fig. 4. Fig. 9 is a cross-section on line *v v* of Fig. 5.

In carrying out my invention I may employ a variety of different styles of the same device, each differing more or less in construction and operation, but all embodying the same underlying principle, as will be apparent.

A represents a hollow inflexible casing or shell of suitable shape, size, and material. Preferably it is round like a tube or cylinder and may be made of paper, pasteboard, papier-mâché, hard rubber, or metal. The tube incloses a follower or ejector 2 and is provided with a slitting tool or knife and with means on its periphery, as the sleeve 3, to operate the knife and ejector. The inflexible tube, the ejector, the knife, and the sleeve or its equivalent constitute the essentials of my invention, and they vary in their construction and operation according to the character of the material to be contained or operated on. Fig. 2 shows the tube of paper or some other suitable cheap material capable of being easily cut with a knife, but sufficiently tenacious as not to crack or split ahead of the knife and also having sufficient tensile strength to resist outward pressure of the contents when the ejector is operated to expel the contents. One end of the tube has a discharge-orifice provided with a suitable screw-cap 4 or equivalent closure. The tube having been filled through the opposite end with lubricant or other matter it is to contain, the ejector 2 is inserted and the open end of the tube behind the ejector closed. A sleeve 3 is slidable on the tube, and suitable means are provided whereby on the removal of the cap 4 and the forward reciprocation of the sleeve the ejector will be correspondingly advanced to cause the contents of the tube to exude, the discharge-orifice of the tube of course being proportioned to the size of the tube, having due regard to the nature of the contents of the tube. The discharge-orifice may be further reduced by a bushing 4', Fig. 3. In order to advance the ejector, I prefer to use a knife or sharp-edged blade, as 6, inserted through the tube behind or engaging with the follower and arranged with its cutting edge in the direction of the length of the tube and toward the discharge-orifice, so that when the sleeve is pushed forward it will carry the knife with it, causing the knife to cut the tube and to propel the ejector without allowing any of the contents of the tube to exude out through the slit made by the knife.

If a tube of such strength and material is used as cannot be easily cut by the knife, I may previously slit the tube, as indicated at 7, Fig. 3, and cover the slit with a thin piece of paper or a wafer 8 on the inside of the tube, pasting the edges of the wafer down on the tube on either side of the slit. In this case preferably the sleeve and pusher-bar 6' are made in one piece by bending a strip of tin or the like centrally to form the blade part 6' and then carrying the ends of the strip around in a circle to inclose the part 6' and uniting these ends by solder, riveting, or otherwise. The part 6' will project through the slit 7 and be free to engage behind the ejector 2. When the sleeve is pushed forward, the pusher 6' will engage behind the ejector and shove it forward, the sharp front edge of the pusher easily cutting through the wafer behind the ejector as the pusher advances. The rear slitted end of the tube may be closed by a cap or seal 9 to prevent the accidental withdrawal of the sleeve and pusher, as well as to support that end of the tube against being accidentally crushed, and to prevent the ingress of dust and dirt to the tube and ejector. This form of device is capable of refilling, it only being necessary to place the wafer over the slit on the inside of the tube to prevent the material exuding and to exclude the air.

The ejector 2 is preferably smaller at its rear end to aid it to move freely, and it is also convexed at that end, so that the pusher may bear centrally on it. At the forward end of the ejector it is advisable in order to render the holder air-tight to use a washer $2^a$, of rubber, felt, or the like, which will serve to thoroughly empty and cleanse the tube of its contents. A central projection 2' operates to remove the last vestige of the contents from the discharge-orifice.
In both the above-described forms of my device the tube itself is the container. In the first case it is used and thrown away. In the second case it may be used but once, or it may be refilled, as stated.
In case it is desired to first inclose the paste, paint, or other material in a separate tube of soft metal—such, for example, as commonly contain artists' oil-paints—I employ a tube A, as in Fig. 4, which is preferably slitted lengthwise, as indicated at 7', with the slit covered over with paper or a wafer 10 on the outside of the tube. B is an inner tube fitting snug within the outer tube A, made of tin, lead, paraffined or oil, paper- or like suitable substance. This inner tube is provided with a discharge-orifice at one end closed by a screw-cap $4^a$ or equivalent means. This end of the inner tube may be supported by an annular flange 11 on tube A.
The opposite end of the inner tube is open and is crimped over the corresponding end of the tube A. The tube B being filled, the ejector-follower is inserted, the sleeve 3 fitted to the outside tube, with the pusher part $6^a$ projecting through slot 7 and piercing the inner tube. When it is desired to expel any of the contents of the holder, the cap $4^a$ is removed and the sleeve moved forward, the pusher acting by its sharp edge as a blade to split both the soft inner tube and the outside paper covering 10. With this form of inner tube and outside holder it is possible to use the same handle over and over again, since by removing the rear cap 9 the edges of the inner tube may be uncrimped from the outer tube, the sleeve, pusher, and ejector removed, and a fresh inner tube inserted and secured in place.

Should the contents of the container be of such a nature that considerable pressure will be required to exude the same or for any other reason it be desired or preferable, the outer tube may be of metal and threaded, as shown at 12, Fig. 5, and a threaded sleeve or collar 13 screwed onto the tube and adapted to press against the unthreaded sleeve 3' to slowly and gradually advance the latter, together with the pusher and ejector, which parts are similar to those described in connection with the other figures.

In all of these forms either where the tube A acts as an immediate container for the material or as a holder for a comparatively soft and flimsy inner tube the tube A serves as a rigid handle, so that in using the device in conjunction with a brush or simply as a dispensing vessel the tube gives the operator a substantial handhold at all times, whether it be full or nearly empty. The ejector-follower having a snug fit in the tube, there is no chance for air to get to the material and cause depreciation of the latter.

It is possible that various changes and modifications may be further made in my invention without departing from its principle, and I do not wish to be understood as limiting myself to the specific construction here shown and described.

Having thus described my invention, what I claim, and desire to secure by Letters Patent, is—

1. A dispensing device comprising a longitudinally-slitted tubular holder having a discharge-orifice at one end, a friable wafer on the inside of the tube and covering the slit therein, a follower operating in a tube, and means separate from the follower and movably mounted on the outside of the tube and having a member operating through said slit to operate the follower.

2. A dispensing device comprising a longitudinally-slitted inflexible tube having a discharge-orifice at one end, a closure for the slit, a follower in the tube, and means separate from the follower and movably mounted on the outside of the tube and having a member operating through the slit, to open the closure and to actuate the follower.

3. A tubular holder having a discharge-orifice, a follower therein, a cutting device movable in the direction of the length of the holder and a sleeve on the outside of the holder and carrying the cutting device, said cutting device engaging the follower to advance it to eject the contents of the holder.

In testimony whereof I have hereunto set my hand in presence of two subscribing witnesses.

GILBERT L. BELCHER.

Witnesses:
JOHN P. CASHIN,
S. H. NOURSE.